United States Patent
Delfort et al.

(10) Patent No.: US 9,486,737 B2
(45) Date of Patent: Nov. 8, 2016

(54) ABSORBENT TERTIARY MONOALKANOLAMINE SOLUTION BELONGING TO THE 3-ALCOXYPROPYLAMINE FAMILY, AND METHOD FOR REMOVING ACIDIC COMPOUNDS CONTAINED IN A GAS EFFLUENT

(71) Applicant: IFP Energies nouvelles, Rueil-Malmaison (FR)

(72) Inventors: Bruno Delfort, Paris (FR); Dominique Le Pennec, Orgerus (FR); Julien Grandjean, Lyons (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 102 days.

(21) Appl. No.: 14/353,502

(22) PCT Filed: Sep. 28, 2012

(86) PCT No.: PCT/FR2012/000387
§ 371 (c)(1),
(2) Date: Apr. 23, 2014

(87) PCT Pub. No.: WO2013/060944
PCT Pub. Date: May 2, 2013

(65) Prior Publication Data
US 2014/0301930 A1    Oct. 9, 2014

(30) Foreign Application Priority Data
Oct. 28, 2011    (FR) ..................... 11 03307

(51) Int. Cl.
*B01D 53/40*    (2006.01)
*B01D 53/52*    (2006.01)
(Continued)

(52) U.S. Cl.
CPC ......... *B01D 53/526* (2013.01); *B01D 53/1462* (2013.01); *B01D 53/1493* (2013.01); *B01D 2251/80* (2013.01); *B01D 2252/20431* (2013.01); *B01D 2252/20478* (2013.01); *B01D 2252/20484* (2013.01); *B01D 2258/0233* (2013.01); *B01D 2258/0283* (2013.01); *B01D 2258/0291* (2013.01); *B01D 2258/05* (2013.01)

(58) Field of Classification Search
None
See application file for complete search history.

(56) References Cited

U.S. PATENT DOCUMENTS 3,253,040 A    5/1966 Potter et al.
3,372,195 A    3/1968 Little
(Continued)

FOREIGN PATENT DOCUMENTS

GB    869405    5/1961

OTHER PUBLICATIONS

Attari et al., "Sampling and analysis of natural gas trace constituents." Inst. of Gas Tech. (Sep. 1, 1993). DOI: 10/2172/10177700.*
(Continued)

*Primary Examiner* — Daniel Berns
(74) *Attorney, Agent, or Firm* — Fitch, Even, Tabin & Flannery LLP

(57) ABSTRACT

The absorbent solution for removing acidic compounds contained in a gas effluent comprises water and at least one amine that is selected from among tertiary monoalkanolamines that contain an etheric function and belong to the 3-alcoxypropylamine family having general formula (A). The method for removing the acidic compounds contained in a gas effluent involves placing a gas effluent 1 into the column C1 together with the absorbent solution 4.

13 Claims, 1 Drawing Sheet

(51) Int. Cl.
*B01D 53/62* (2006.01)
*B01D 53/78* (2006.01)
*B01D 53/96* (2006.01)
*B01D 53/14* (2006.01)

(56) References Cited

U.S. PATENT DOCUMENTS

| | | | |
|---|---|---|---|
| 4,405,811 | A | 9/1983 | Stogryn et al. |
| 6,852,144 | B1 | 2/2005 | Wagner et al. |
| 2008/0098892 | A1* | 5/2008 | Asprion ............ B01D 53/1475 95/236 |

OTHER PUBLICATIONS

Database Registry, Chemical Abstracts Service XP002677595 dated Nov. 2, 2010 in English.
Haim Weizman, Fluorescently-Labeled Ferrichrome Analogs as Probes for Receptor-Mediated, Microbial Iron Uptake, J. Am. Chem. Society, 1996, 118, pp. 12368-12375 in English.
Frank Whitmore, et al., Basically Substituted Aliphatic Nitriles and Their Catalytic Reduction to Amines, J. Am. Chem. Society, vol. 66, May 1944, pp. 725-731 in English.
Wiedeman et al., Some Amine Derivatives of Acrylonitrile, Nov. 1945, J. Am. Chem. Society, vol. 67, pp. 1994-1996 in English.

* cited by examiner

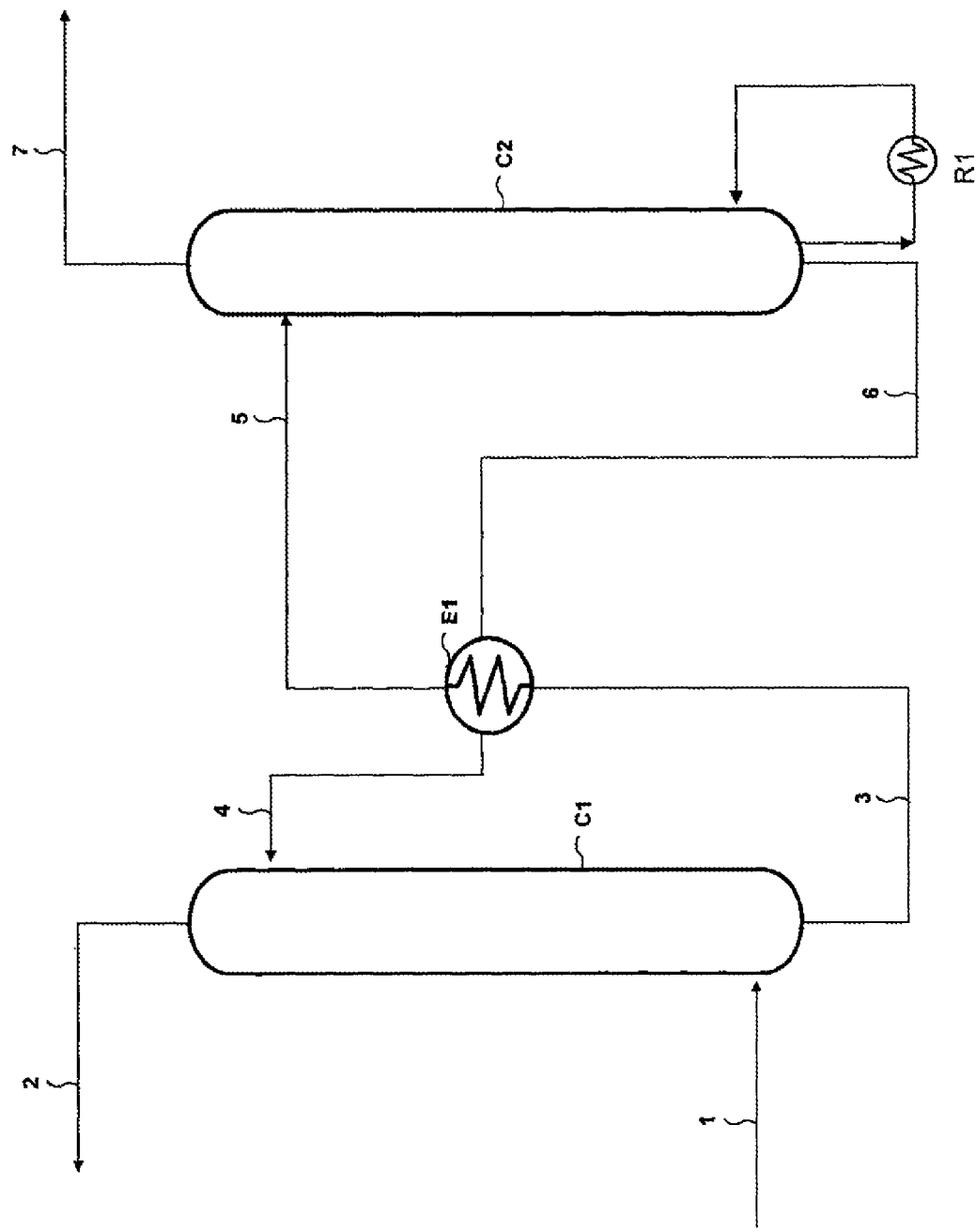

ABSORBENT TERTIARY MONOALKANOLAMINE SOLUTION BELONGING TO THE 3-ALCOXYPROPYLAMINE FAMILY, AND METHOD FOR REMOVING ACIDIC COMPOUNDS CONTAINED IN A GAS EFFLUENT

BACKGROUND

1. Technical Field

The present invention relates to the field of processes for the deacidification of gaseous effluent. The invention advantageously applies to the treatment of gas of industrial origin and natural gas.

2. Description of the Art

Absorption processes employing an aqueous solution of amines are commonly used to remove the acidic compounds (in particular $CO_2$, $H_2S$, COS, $CS_2$, $SO_2$ and mercaptans) present in a gas. The gas is deacidified by being brought into contact with the absorbent solution and then the absorbent solution is thermally regenerated. For example, the document U.S. Pat. No. 6,852,144 describes a method for removing the acidic compounds from hydrocarbons. The method uses an absorbent solution formed of water/N-methyldiethanolamine or water/triethanolamine comprising a high proportion of a compound belonging to the following group: piperazine and/or methylpiperazine and/or morpholine.

A limitation of the absorbent solutions commonly used in deacidification applications is an inadequate selectivity for absorption of $H_2S$ with respect to $CO_2$. This is because, in some cases of deacidification of natural gas, selective removal of $H_2S$ is desired, while limiting as much as possible the absorption of $CO_2$. This constraint is particularly important for gases to be treated already comprising a $CO_2$ content lower than or equal to the desired specification. A maximum $H_2S$ absorption capacity, with a maximum $H_2S$ absorption selectivity with respect to $CO_2$, is then desired. This selectivity makes it possible to maximize the amount of treated gas produced and to recover an acid gas at the regenerator outlet having the highest possible $H_2S$ concentration, which limits the size of the units of the sulfur line downstream of the treatment and guarantees a better operation. In some cases, an $H_2S$ enriching unit is necessary in order to concentrate the acid gas in $H_2S$. In this case, the most selective amine is also desired. Tertiary amines, such as N-methyldiethanolamine, or hindered amines exhibiting slow kinetics of reaction with $CO_2$ are commonly used but exhibit limited selectivities at high $H_2S$ loading contents.

Another limitation of the absorbent solutions commonly used in total deacidification applications is excessively slow kinetics for capture of $CO_2$ or COS. In the case where the specifications desired with regard to $CO_2$ or COS are very severe, the fastest possible reaction kinetics are desired so as to reduce the height of the absorption column, this item of equipment under pressure, typically between 20 and 90 bar, representing a major part of the capital costs of the process.

Whether maximum kinetics for capture of $CO_2$ and COS in a total deacidification application or minimum kinetics of capture of $CO_2$ in a selective application is being sought for, it is always desirable to use an absorbent solution having the greatest possible cyclic capacity. This cyclic capacity, denoted $\Delta\alpha$, corresponds to the difference in loading content ($\alpha$ denoting the number of moles of acid compounds absorbed $n_{acid\ gas}$ per kilogram of absorbent solution) between the absorbent solution feeding the absorption column and the absorbent solution withdrawn at the bottom of said column. This because the more the absorbent solution has a high cyclic capacity, the more limited is the flow rate of absorbent solution which is necessary to employ to deacidify the gas to be treated. In gas treatment processes, the reduction in the flow rate of absorbent solution also has a strong impact on the reduction in capital costs, in particular with regard to the size of the absorption column.

Another essential aspect of the operations for the treatment of industrial gases, or flue gases, by a solvent remains the regeneration of the separating agent. According to the type of absorption (physical and/or chemical), a regeneration by reduction in pressure and/or by distillation and/or by entrainment by vaporized gas, known as "stripping gas", is generally envisaged.

Another limitation of the absorbent solutions commonly used today is an energy consumption necessary for the regeneration of the solvent which is too high. This is particularly true in the case where the partial pressure of acid gases is low. For example, for a 30% by weight aqueous solution of 2-aminoethanol (or monoethanolamine or ethanolamine or MEA) used to capture $CO_2$ in postcombustion in a power plant flue gas, where the $CO_2$ partial pressure is of the order of 0.12 bar, the regeneration energy represents approximately 3.7 GJ per tonne of $CO_2$ captured. Such an energy consumption represents a considerable operating cost for the process for capturing $CO_2$.

It is well known to a person skilled in the art that the energy necessary for the regeneration by distillation of an amine solution can be broken down according to three different headings: the energy necessary to reheat the solvent between the top and the bottom of the regenerator, the energy necessary to lower the acid gas partial pressure in the regenerator by vaporization of a stripping gas and, finally, the energy necessary to break the chemical bond between the amine and the $CO_2$.

These first two headings are inversely proportional to the flow rates of absorbent solution which it is necessary to circulate in the unit to achieve a given specification. In order to reduce energy consumption associated with the regeneration of the solvent, it is thus preferable yet again to maximize the cyclic capacity of the solvent.

It is difficult to find compounds, or a family of compounds, which make/makes it possible for the various deacidification processes to operate at reduced operating costs (including the regeneration energy) and capital costs (including the cost of the absorption column).

It well known to a person skilled in the art that tertiary amines or secondary amines with severe steric hindrance have slower kinetics for capture of $CO_2$ than primary or secondary amines exhibiting relatively little hindrance. On the other hand, tertiary or secondary amines with a severe steric hindrance have instantaneous kinetics for capture of $H_2S$, which makes it possible to carry out a selective removal of $H_2S$ based on distinct kinetic performances.

Among the applications of these tertiary or hindered amines, the document FR 2 100 475 describes a process for the selective absorption of sulfur-comprising gases by an absorbent compound in aqueous solution, the compound having a general formula which may comprise a tertiary amine, one of the substituents of which comprises an ether functional group, but excluding alkanolamines.

The U.S. Pat. No. 4,405,811 describes a process for the selective removal of $H_2S$ in gases comprising $H_2S$ and $CO_2$ by an absorbent comprising amines of tertiary alkanolamine type which may or may not comprise one or more ether functional groups which, in this case, necessarily occur on the hydroxylated substituent.

SUMMARY

The inventors have discovered that amines of tertiary monoalkanolamine type, comprising or not comprising an ether functional group, are not equivalent in terms of performance for their use in absorbent solution formulations for the treatment of acid gases in an industrial process.

A subject matter of the present invention is the use of tertiary monoalkanolamines including an ether functional group and belonging to the family of the 3-alkoxypropylamines.

Generally, a subject matter of the present invention is an absorbent solution for removing acid compounds present in a gaseous effluent, comprising:
  water;
  at least one amine corresponding to the following general formula (A):

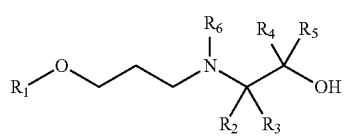

(A)

in which:
  $R_1$ is an alkyl radical including from 1 to 6 carbon atoms,
  $R_2$, $R_3$ and $R_4$ are independently chosen from a hydrogen atom and an alkyl radical including from 1 to 6 carbon atoms,
  $R_5$ is chosen without distinction from a hydrogen atom and an alkyl radical including from 1 to 6 carbon atoms,
  $R_6$ is an alkyl radical including from 1 to 6 carbon atoms.

According to the invention, the amine can be chosen from the following compounds: N-methyl-N-(3-methoxypropyl)-2-aminoethanol, N-methyl-N-(3-methyloxypropyl)-1-amino-2-propanol, N-methyl-N-(3-methoxypropyl)-1-amino-2-butanol, N-ethyl-N-(3-methoxypropyl)-2-aminoethanol, N-ethyl-N-(3-methoxypropyl)-1-amino-2-propanol, N-ethyl-N-(3-methoxypropyl)-1-amino-2-butanol, N-isopropyl-N-(3-methoxypropyl)-2-aminoethanol, N-isopropyl-N-(3-methoxypropyl)-1-amino-2-propanol and N-isopropyl-N-(3-methoxypropyl)-1-amino-2-butanol. Preferably, the amine is N-methyl-N-(3-methoxypropyl)-2-aminoethanol.

The absorbent solution can comprise between 10% and 90% by weight of said amine and between 10% and 90% by weight of water.

The absorbent solution can additionally comprise a non-zero amount which is less than 20% by weight of a primary or secondary amine compound.

Said primary or secondary amine compound can be chosen from the group consisting of:
  MonoEthanolAmine,
  N-butylethanolamine,
  Aminoethylethanolamine,
  Diglycolamine,
  Piperazine,
  N-(2-hydroxyethyl)Piperazine,
  N-(2-aminoethyl)Piperazine,
  Morpholine,
  3-(methylamino)propylamine,
  1,6-hexanediamine,
  N,N'-dimethyl-1,6-hexanediamine.

The absorbent solution can additionally comprise a physical solvent chosen from methanol and sulfolane.

Another subject-matter of the invention is a process for the removal of the acid compounds present in a gaseous effluent, in which a stage of absorption of the acidic compounds is carried out by bringing the gaseous effluent into contact with an absorbent solution according to the invention.

According to the invention, the stage of absorption of the acid compounds can be carried out at a pressure of between 1 bar and 120 bar and at a temperature of between 20° C. and 100° C.

After the absorption stage, a gaseous effluent depleted in acid compounds and an absorbent solution laden with acid compounds can be obtained and at least one stage of regeneration of the absorbent solution laden with acid compounds can be carried out.

The regeneration stage can be carried out at a pressure of between 1 bar and 10 bar and at a temperature between 100° C. and 180° C.

The gaseous effluent can be chosen from natural gas, synthesis gases, combustion flue gases, refinery gases, acid gases resulting from an amine unit, gases resulting from a tail gas reduction unit of the Claus process, biomass fermentation gases, gases from cement works or incinerator flue gases.

In the process according to the invention, the gaseous effluent can be a natural gas comprising $H_2S$ and $CO_2$ used for the selective removal of $H_2S$ with respect to $CO_2$.

The use of the 3-alkoxypropylamine compounds according to the invention makes it possible to obtain greater absorption capacities for acid gases than the reference amines. This performance is enhanced as a result of the greater basicity.

Furthermore, the compounds according to the invention exhibit a greater selective absorption for $H_2S$ with respect to $CO_2$ than the reference amines.

Other characteristics and advantages of the invention will be better understood and will become more clearly apparent on reading the description made below, with reference to FIG. 1, representing a flowsheet of a process for the treatment of acid gases.

BRIEF DESCRIPTION OF THE DRAWING

FIG. 1 shows a flowsheet of a process for the treatment of acid gases.

DETAILED DESCRIPTION OF PREFERRED EMBODIMENTS

The present invention provides an aqueous solution comprising at least one compound belonging to the family of the 3-alkoxypropylamines in order to remove the acid compounds present in a gaseous effluent.

Synthesis of a Molecule According to the General Formula of the Invention

The molecules of the invention can be synthesized using any route allowed by organic chemistry. Among these, mention may be made of one of them without being exhaustive.

It is represented by the following scheme and calls for a few comments.

It is possible to prepare the 3-alkoxypropylamines according to the invention by a process which does not generate any salt and which is compatible with an industrial development. This procedure involves a series of four reactions, only one of which generates a coproduct, which is water.

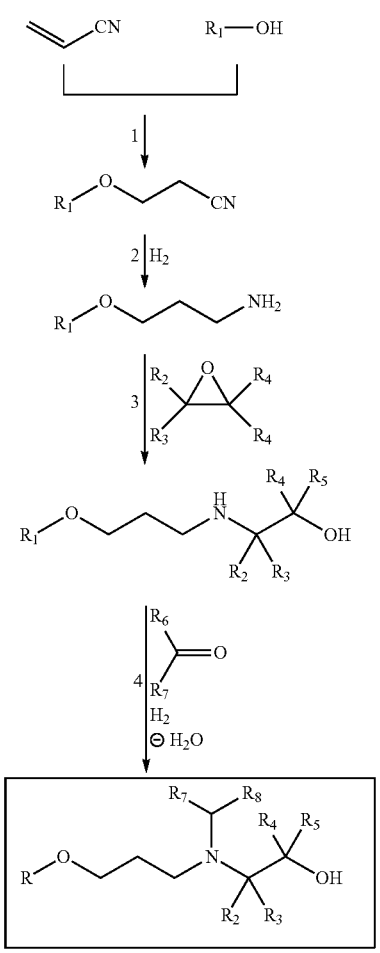

The starting material used is acrylonitrile, which is an industrial molecule, precursor of polymers, plentifully available worldwide and low in cost.

The first stage consists of the addition of a molecule of an alcohol of formula $R_1$—OH to an acrylonitrile molecule in order to result in the 3-alkoxypionitrile (reaction 1) according to a reaction which is well known and copiously documented. This reaction is described in particular in The Journal of the American Chemical Society, 725-731 (1944), and ibid., 118 (49), 12368-12375 (1996). This reaction, which is an addition reaction, does not generate any by-product. It can be promoted in the presence of bases. The document DE 2121325 (1972), for example, describes the synthesis of 3-methoxypropionitrile by reaction of methanol and acrylonitrile in the presence of a triethanolamine derivative.

It can be advantageous, in reaction 1, to operate either with an excess of acrylonitrile or with an excess of alcohol. Either of the excess reactants is easily separated, for example by distillation, at the end of reaction 1 and then recycled in the process. Consequently, in this stage, optional recourse to the use of an excess of either of the reactants to achieve the maximum conversion under advantageous conditions of time and temperature is entirely compatible with the process described.

The second stage consists of the hydrogenation of the 3-alkoxypropionitrile to result in the 3-alkoxypropylamine according to the well known reaction for the reduction of nitrile functional groups to give primary amine functional groups (reaction 2). This reaction can be carried out with any means known to a person skilled in the art in accordance with organic chemistry. It can be carried out, for example, by means of an appropriate hydride, such as lithium aluminum hydride. It can, according to the invention, preferably be carried out in the presence of hydrogen or in the presence of hydrogen and ammonia by means of an appropriate catalyst, such as, for example, nickel derivatives. This reaction is an addition reaction of hydrogen to the nitrile functional group and does not generate any by-product.

O. F. Wiedman et al. describe, in J. Am. Chem. Soc. (1945), p. 1194, a general method for the hydrogenation of dicyanoethyl ether to give diaminopropyl ether in the presence of Raney nickel and ammonia at between 50 and 150 bar and at a temperature of 80° C. to 125° C. The document GB 869405 (1961), for example, describes the hydrogenation of 3-methoxypropionitrile to give 3-methoxy-propanamine in the presence of hydrogen, ammonia and Raney nickel at 150° C. under 200 bar.

The document U.S. Pat. No. 3,253,040 (1966), for example, describes the hydrogenation of 3-methoxypropionitrile to give 3-methoxy-propanamine in the presence of hydrogen and Raney nickel at 110° C. under 10 bar.

The document U.S. Pat. No. 3,372,195 (1968), for example, describes the hydrogenation of 3-methoxypropionitrile to give 3-methoxy-propanamine in the presence of hydrogen and ammonia and a ruthenium-based catalyst at 125° C. under 70 bar.

The third stage consists of the reaction of the 3-alkoxypropylamine obtained above with a substituted or unsubstituted epoxide according to a well known monoaddition reaction (reaction 3). The product obtained is an N-(3-alkoxypropyl)-2-aminoalkanol. It can be advantageous, in order to obtain the desired monoaddition compound, to operate with an excess of 3-alkoxypropylamine, which is subsequently separated, for example by distillation.

Finally, the fourth stage consists of the alkylation of the N-(3-alkoxypropyl)-2-aminoalkanol obtained above in order to obtain an N-alkyl-N-(3-alkoxypropyl)-2-aminoalkanol which is the product of the invention (reaction 4).

This alkylation of the nitrogen atom can be carried out by means of any method permitted by organic chemistry and known to a person skilled in the art. Mention may be made, for example, of the Eschweiler-Clarke methylation reaction, which requires a mixture of formaldehyde and formic acid. Mention may also be made of the Leuckart reaction, which uses a ketone or an aldehyde and an ammonium formate. It is preferable, for the invention, to carry out the alkylation by the catalytic reductive alkylation reaction of amines by means of an aldehyde or a ketone in the presence of hydrogen and an appropriate catalyst. The catalytic reduction alkylation reactions of amines exhibit, inter alia, the advantage of being fast and selective and of generating, as by-product, only water. They are widely used in industrial processes for the manufacture of alkylamines, such as methylamines or ethylamines, and are compatible with the technologies used industrially.

It is possible, for example, to carry out the methylation of N-(3-methoxypropyl)-2-aminoethanol to give N-methyl-N-(3-methoxypropyl)-2-aminoethanol in an autoclave reactor by reaction of N-(3-methoxypropyl)-2-aminoethanol with excess formaldehyde under a hydrogen pressure of 20 bar at 120° C. in 3 hours in the presence of a palladium-on-charcoal catalyst. The $^{13}$C NMR (CDCl$_3$) characteristics of N-methyl-N-(3-methoxypropyl)-2-aminoethanol are as follows:

57.7 ppm: $CH_3-O-CH_2-CH_2-CH_2-N(CH_3)-CH_2-CH_2-OH$
70.2 ppm: $CH_3-O-CH_2-CH_2-CH_2-N(CH_3)-CH_2-CH_2-OH$
26.7 ppm: $CH_3-O-CH_2-CH_2-CH_2-N(CH_3)-CH_2-CH_2-OH$
54.1 ppm: $CH_3-O-CH_2-CH_2-CH_2-N(CH_3)-CH_2-CH_2-OH$
41.4 ppm: $CH_3-O-CH_2-CH_2-CH_2-N(CH_3)-CH_2-CH_2-OH$
54.4 ppm: $CH_3-O-CH_2-CH_2-CH_2-N(CH_3)-CH_2-CH_2-OH$
58.8 ppm: $CH_3-O-CH_2-CH_2-CH_2-N(CH_3)-CH_2-CH_2-OH$ It is possible, for example, to carry out the ethylation of N-(3-methoxypropyl)-2-aminoethanol to give N-ethyl-N-(3-methoxypropyl)-2-aminoethanol by following the same procedure but replacing the formaldehyde with acetaldehyde.

It is possible, for example, to carry out the isopropylation of N-(3-methoxypropyl)-2-aminoethanol to give N-isopropyl-N-(3-methoxypropyl)-2-aminoethanol by following the same procedure but replacing the formaldehyde with acetone.

An alternative form of this route for accessing the molecules of the invention (not represented in the FIGURE) can resort to acrylamide instead of acrylonitrile. The first stage is an addition of the alcohol to the acrylamide, resulting in 3-alkoxypropanamide, which is subsequently hydrogenated to give 3-alkoxypropylamine during a second stage. Stages 3 and 4 are the same as those described above.

Nature of the Gaseous Effluents

The absorbent solutions according to the invention can be employed to deacidify the following gaseous effluents: natural gas, synthesis gases, combustion flue gases, refinery gases, acid gases resulting from an amine unit, gases resulting from a tail gas reduction unit of the Claus process, biomass fermentation gases, gases from cement works or incinerator flue gases. These gaseous effluents comprise one or more of the following acid compounds: $CO_2$, $H_2S$, mercaptans, COS, $CS_2$ or $SO_2$.

The combustion flue gases are produced in particular by the combustion of hydrocarbons, biogas, coal in a boiler or for a combustion gas turbine, for example with the aim of producing electricity. By way of illustration, the process according to the invention can be employed to absorb at least 70%, preferably at least 80%, indeed even at least 90%, of the $CO_2$ present in the combustion flue gases. These flue gases generally have a temperature of between 20 and 60° C. and a pressure of between 1 and 5 bar and can comprise between 50% and 80% of nitrogen, between 5% and 40% of carbon dioxide, between 1% and 20% of oxygen and a few impurities, such as $SO_x$ and $NO_x$, if they have not been removed upstream of the deacidification process. In particular, the process according to the invention is particularly well suited to absorbing $CO_2$ present in combustion flue gases comprising a low $CO_2$ partial pressure, for example a $CO_2$ partial pressure of less than 200 mbar.

The process according to the invention can be used to deacidify a synthesis gas. Synthesis gas comprises carbon monoxide CO, hydrogen $H_2$ (generally in an $H_2$/CO ratio equal to 2), water vapor (generally at saturation at the temperature at which the washing is carried out) and carbon dioxide $CO_2$ (of the order of approximately 10%). The pressure is generally between 20 and 30 bar but can reach up to 70 bar. In addition, it comprises sulfur-comprising impurities ($H_2S$, COS, and the like), nitrogen-comprising impurities ($NH_3$, HCN) and halogen-comprising impurities.

The process according to the invention can be used to deacidify a natural gas. Natural gas is predominantly composed of gaseous hydrocarbons but can comprise several of the following acid compounds: $CO_2$, $H_2S$, mercaptans, COS or $CS_2$. The content of these acid compounds is highly variable and can range up to 40% of $CO_2$ and $H_2S$. The temperature of the natural gas can be between 20° C. and 100° C. The pressure of the natural gas to be treated can be between 10 and 120 bar. The invention can be implemented in order to achieve specifications generally imposed on the deacidified gas, which are less than 2% of $CO_2$, indeed even less than 50 ppm of $CO_2$, in order subsequently to carry out liquefaction of natural gas, and less than 4 ppm of $H_2S$, and less than 50 ppm, indeed even less than 10 ppm, total sulfur volume.

Composition of the Absorbent Solution

The absorbent solution according to the invention comprises:

a—water;

b—at least one amine chosen from tertiary monoalkanolamines including an ether functional group and belonging to the family of the 3-alkoxypropylamines corresponding to the following general formula (A):

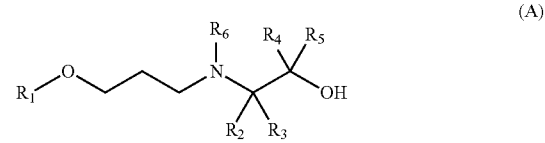

in which $R_1$ to $R_6$ are defined below.

$R_1$ is an alkyl radical including from 1 to 6 carbon atoms and preferably 1 to 2 carbon atoms.

$R_2$, $R_3$ and $R_4$ are independently chosen from a hydrogen atom or an alkyl radical including from 1 to 6 carbon atoms and preferably 1 to 2 carbon atoms.

Preferably, $R_2$, $R_3$ and $R_4$ are hydrogen atoms.

$R_5$ is chosen without distinction from a hydrogen atom or an alkyl radical including from 1 to 6 carbon atoms and preferably 1 to 2 carbon atoms.

Preferably, $R_5$ is a hydrogen atom or an alkyl radical including 1 to 2 carbon atoms.

$R_6$ is an alkyl radical including from 1 to 6 carbon atoms and preferably 1 to 3 carbon atoms.

The $R_6$ radical can be defined more specifically by the general formula

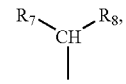

in which $R_7$ and $R_8$ can each be a hydrogen atom or $R_7$ can be a hydrogen atom and $R_8$ can be chosen from an alkyl radical including from 1 to 5 carbon atoms or else $R_7$ and $R_8$ can each be an alkyl radical including from 1 to 4 carbon atoms in accordance with the definition of $R_6$.

Preferably, $R_6$ is a methyl, ethyl, propyl or isopropyl radical.

In other words, the absorbent solution according to the invention comprises at least one amine corresponding to the general formula (A), in aqueous solution.

For example, the absorbent solution according to the invention can comprise an amine corresponding to the formula (A) chosen from the following compounds:

N-methyl-N-(3-methoxypropyl)-2-aminoethanol 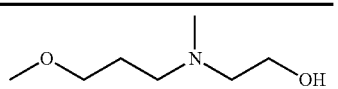

N-methyl-N-(3-methoxypropyl)-1-amino-2-propanol 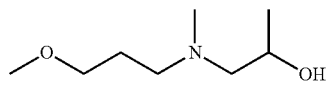

N-methyl-N-(3-methoxypropyl)-1-amino-2-butanol 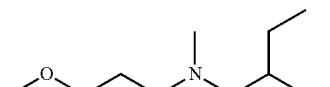

N-ethyl-N-(3-methoxypropyl)-2-aminoethanol 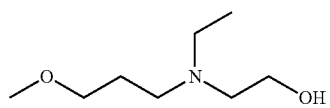

N-ethyl-N-(3-methoxypropyl)-1-amino-2-propanol 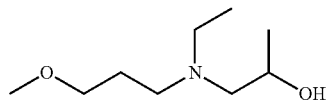

N-ethyl-N-(3-methoxypropyl)-1-amino-2-butanol 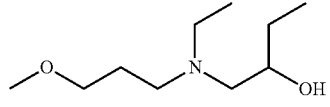

N-isopropyl-N-(3-methoxypropyl)-2-aminoethanol 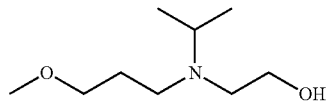

N-isopropyl-N-(3-methoxypropyl)-1-amino-2-propanol 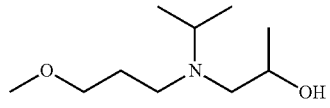

N-isopropyl-N-(3-methoxypropyl)-1-amino-2-butanol 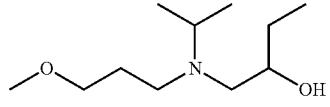

Preferably, the absorbent solution according to the invention is composed of a solution of water as a mixture with the following amine:

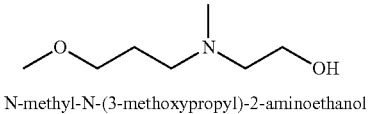

N-methyl-N-(3-methoxypropyl)-2-aminoethanol

The amines according to the general formula (A) can be in a variable concentration in the absorbent solution, for example between 10% and 90% by weight, preferably between 20% and 60% by weight, very preferably between 30% and 50% by weight.

The absorbent solution can comprise between 10% and 90% by weight of water, preferably between 40% and 80% by weight of water, very preferably from 50% to 70% of water.

In one embodiment, the amines according to the general formula (A) can be formulated with a compound comprising at least one primary or secondary amine functional group. For example, the absorbent solution comprises up to a concentration of less than 20% by weight, preferably of less than 15% by weight, preferably of less than 10% by weight, of said compound comprising at least one primary or secondary amine functional group. Preferably, the absorbent solution comprises at least 0.5% by weight of said compound comprising at least one primary or secondary amine functional group. Said compound makes it possible to accelerate the kinetics of absorption of the COS and, in some cases, of the $CO_2$ present in the gas to be treated.

A nonexhaustive list of compounds comprising at least one primary or secondary amine functional group which can participate in the formulation is given below:
Monoethanolamine,
N-butylethanolamine,
Aminoethylethanolamine,
Diglycolamine,
Piperazine,
N-(2-hydroxyethyl)piperazine,
N-(2-aminoethyl)piperazine,
Morpholine,
3-(methylamino)propylamine,
1,6-hexanediamine,
N,N'-dimethyl-1,6-hexanediamine.

The absorbent solution can additionally comprise a physical solvent, such as, for example, methanol and sulfolane.

Process for the Removal of the Acid Compounds in a Gaseous Effluent

The use of an aqueous solution comprising a compound according to the general formula (A) to deacidify a gaseous effluent is carried out schematically by performing an absorption stage, followed by a regeneration stage, for example as represented by FIG. 1.

With reference to FIG. 1, the absorption stage consists in bringing the gaseous effluent 1 into contact with the absorbent solution 4. The gaseous effluent 1 is introduced at the bottom of C1 and the absorbent solution is introduced in the top of C1. The column C1 is provided with means for bringing gas and liquid into contact, for example a random packing, a structured packing or plates. During the contact, the amine functional groups of the molecules according to the general formula (A) of the absorbent solution react with the acid compounds present in the effluent, so as to obtain a gaseous effluent depleted in acid compounds 2 discharged at the top of C1 and an absorbent solution enriched in acid compounds 3 discharged at the bottom of C1 in order to be regenerated.

The regeneration stage consists in particular in heating and optionally in reducing in pressure the absorbent solution enriched in acid compounds in order to release the acid compounds in the gaseous form. The absorbent solution enriched in acid compounds 3 is introduced into the heat exchanger E1, where it is reheated by the stream 6 originating from the regeneration column C2. The reheated solution 5, at the outlet of E1, is introduced into the regeneration column C2.

The regeneration column C2 is equipped with internal features for bringing gas and liquid into contact, for example plates or random or structured packings. The bottom of the column C2 is equipped with a reboiler R1 which provides the heat necessary for regeneration by vaporizing a fraction of the absorbent solution. In the column C2, under the effect of the operation in which the absorbent solution arriving via 5 is brought into contact with the vapor produced by the reboiler, the acid compounds are released in the gaseous form and discharged at the top of C2 via the pipe 7. The regenerated absorbent solution 6, that is to say the absorbent solution depleted in acid compounds 6, is cooled in E1 and then recycled to the column C1 via the pipe 4.

The stage of absorption of the acid compounds can be carried out at a pressure in C1 of between 1 bar and 120 bar, preferably between 20 bar and 100 bar for the treatment of a natural gas, preferably between 1 bar and 3 bar for the treatment of industrial flue gases, and at a temperature in C1 of between 20° C. and 100° C., preferably of between 30° C. and 90° C., indeed even between 30° C. and 60° C.

The regeneration stage of the process according to the invention can be carried out by thermal regeneration, optionally supplemented by one or more pressure-reduction stages.

The regeneration can be carried out at a pressure in C2 of between 1 bar and 5 bar, indeed even up to 10 bar, and at a temperature in C2 of between 100° C. and 180° C. Preferably, the regeneration temperature in C2 is between 155° C. and 180° C. in the case where it is desired to reinject the acid gases.

EXAMPLES

Example 1

Synthesis Procedure

This example illustrates the synthesis of the molecules of the invention and also a molecule intended for a comparative example according to the synthesis route described above, it being understood that not all the possibilities for synthesis of these molecules, either with regard to the synthesis routes or the possible procedures, are described here.

Synthesis of
N-methyl-N-(3-methoxypropyl)-2-aminoethanol
(Intended for an Example According to the Invention)

In a first step, 1.6 mol of ethylene oxide are added, with stirring over 1 hour at a temperature not exceeding 25° C., to a mixture of 3.22 mol of commercially available 3-methoxypropylamine diluted in 500 ml of water and then the stirring is continued for an additional hour at ambient temperature. After distilling off the water and the excess 3-methoxypropylamine, 140 g of N-(3-methoxypropyl)-2-aminoethanol are collected between 120° C. and 124° C. under 20 mbar.

In a second stage, 451 mmol of N-(3-methoxypropyl)-2-aminoethanol prepared above, 2.25 mol of 37% formaldehyde in water and 0.5 g of a Pd/C catalyst are introduced into an autoclave reactor. Hydrogen is introduced at a pressure of 20 bar and the medium is brought to a temperature of 80° C. for 4 hours. After returning to ambient temperature, the catalyst is separated by filtration and, after distillation, 52 g of a product are collected, the NMR (CDCl$_3$) spectrum of which is in accordance with that of N-methyl-N-(3-methoxypropyl)-2-aminoethanol and the characteristics of which are as follows:
57.7 ppm: CH$_3$—O—CH$_2$—CH$_2$—CH$_2$—N(CH$_3$)—CH$_2$—CH$_2$—OH
70.2 ppm: CH$_3$—O—CH$_2$—CH$_2$—CH$_2$—N(CH$_3$)—CH$_2$—CH$_2$—OH
26.7 ppm: CH$_3$—O—CH$_2$—CH$_2$—CH$_2$—N(CH$_3$)—CH$_2$—CH$_2$—OH
54.1 ppm: CH$_3$—O—CH$_2$—CH$_2$—CH$_2$—N(CH$_3$)—CH$_2$—CH$_2$—OH
41.4 ppm: CH$_3$—O—CH$_2$—CH$_2$—CH$_2$—N(CH$_3$)—CH$_2$—CH$_2$—OH
54.4 ppm: CH$_3$—O—CH$_2$—CH$_2$—CH$_2$—N(CH$_3$)—CH$_2$—CH$_2$—OH
58.8 ppm: CH$_3$—O—CH$_2$—CH$_2$—CH$_2$—N(CH$_3$)—CH$_2$—CH$_2$—OH Synthesis of
N-methyl-N-(2-methoxyethyl)-2-aminoethanol
(Intended for a Comparative Example)

2.64 mol of 2-methylaminoethanol and 0.529 mol of 2-chloroethyl methyl ether, both commercially available, are introduced into a reactor and then the medium is brought to a temperature of 80° C. for 6 hours. After returning to ambient temperature, the medium is neutralized with aqueous sodium hydroxide solution, then the water, the salt and the excess and residual reactants are removed and, after distillation, 30 g of a product are collected, the NMR (CDCl$_3$) spectrum of which is in accordance with that of N-methyl-N-(2-methoxyethyl)-2-aminoethanol and the characteristics of which are as follows:
56.2 ppm: CH$_3$—O—CH$_2$—CH$_2$—N(CH$_3$)—CH$_2$—CH$_2$—OH
69.8 ppm: CH$_3$—O—CH$_2$—CH$_2$—N(CH$_3$)—CH$_2$—CH$_2$—OH
57.9 ppm: CH$_3$—O—CH$_2$—CH$_2$—N(CH$_3$)—CH$_2$—CH$_2$—OH
42.2 ppm: CH$_3$—O—CH$_2$—CH$_2$—N(CH$_3$)—CH$_2$—CH$_2$—OH
58.4 ppm: CH$_3$—O—CH$_2$—CH$_2$—N(CH$_3$)—CH$_2$—CH$_2$—OH
59.0 ppm: CH$_3$—O—CH$_2$—CH$_2$—N(CH$_3$)—CH$_2$—CH$_2$—OH Example 2

Capacity and Selectivity for Removal of H$_2$S from a Gaseous Effluent Comprising H$_2$S and CO$_2$ by an N-methyl-N-(3-methoxypropyl)-2-aminoethanol Solution A test of absorption at 40° C. is carried out on aqueous amine solutions within a perfectly stirred, gas side open, reactor.

For each solution, the absorption is carried out in a liquid volume of 50 cm$^3$ by bubbling a gas stream composed of a nitrogen:carbon dioxide:hydrogen sulfide mixture, in proportions by volume of 89:10:1, with a flow rate of 30 Sl/h for 90 minutes.

On conclusion of the test, the H$_2$S loading content obtained (α=number of moles of H$_2$S/kg of solution) and also the absorption selectivity with regard to CO$_2$ are measured.

This selectivity S is defined in the following way:

$$S = \frac{\alpha_{H2S}}{\alpha_{CO2}} \times \frac{(CO_2 \text{ concentration in the gas mixture})}{(H_2S \text{ concentration in the gas mixture})}$$

i.e., under the conditions of the test described, here $$S = 10 \times \frac{\alpha_{H2S}}{\alpha_{CO2}}$$

By way of example, the loading contents and the selectivity can be compared between a 50% by weight absorbent solution of N-methyl-N-(3-methoxypropyl)-2-aminoethanol according to the invention and a 47% by weight absorbent solution of methyldiethanolamine (MDEA), a reference compound for the selective removal of $H_2S$ in the treatment of natural gas, and also a 50% absorbent solution of tert-butyldiethanolamine (tBu-DEA), a tertiary monoalkanolamine according to the general formula of the U.S. Pat. No. 4,405,811 which is devoid of ether functional group. The solution according to the invention can also be compared with an absorbent solution of N-methyl-N-(2-methoxyethyl)-2-aminoethanol, a tertiary monoalkanolamine which includes an ether functional group but which belongs to the family of the 2-alkoxyethylamines distinct from the 3-alkoxypropylamines according to the invention.

| Compounds | Concentration | T (° C.) | $H_2S$ loading content (mol/kg) | Selectivity |
|---|---|---|---|---|
| MDEA | 47% | 40 | 0.16 | 6.3 |
| tBu-DEA (according to the general formula of the document U.S. Pat. No. 4,405,811) | 50% | 40 | 0.15 | 7.6 |
| N-methyl-N-(2-methoxyethyl)-2-aminoethanol | 50% | 40 | 0.08 | 3.0 |
| N-methyl-N-(3-methoxypropyl)-2-aminoethanol (according to the invention) | 50% | 40 | 0.21 | 11.1 |

This example illustrates the gains in loading content and in selectivity which can be achieved with an absorbent solution according to the invention, comprising 50% by weight of N-methyl-N-(3-methoxypropyl)-2-aminoethanol.

This example illustrates that tertiary monoalkanolamines are not all equivalent in terms of performance. Specifically, MDEA and tert-butyldiethanolamine (entry 2 of the table) do not comprise an ether functional group in contrast to the molecules of the invention.

Furthermore, this example illustrates that the tertiary monoalkanolamines including an ether functional group are not all equivalent in terms of performance. In N-methyl-N-(2-methoxyethyl)-2-aminoethanol (entry 3 of the table), the amine is an alkoxyethylamine and not an alkoxypropylamine, as in the invention. The example thus demonstrates that the structure of the alkoxypropylamine according to the invention exhibits a specific and improved performance.

The invention claimed is:

1. A process for the removal of the acid compounds present in a gaseous effluent, in which a stage of absorption of the acidic compounds is carried out by bringing the gaseous effluent into contact with an absorbent solution comprising:
    water;
    at least one amine corresponding to the following general formula (A):

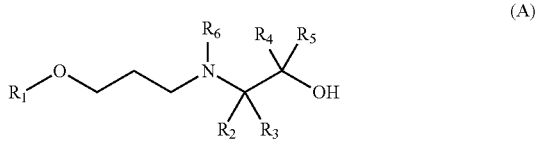

(A)

in which:
    $R_1$ is an alkyl radical including from 1 to 6 carbon atoms,
    $R_2$, $R_3$ and $R_4$ are independently chosen from a hydrogen atom and an alkyl radical including from 1 to 6 carbon atoms,
    $R_5$ is an alkyl radical including from 1 to 6 carbon atoms,
    $R_6$ is an alkyl radical including from 1 to 6 carbon atoms.

2. The process as claimed in claim 1, in which the gaseous effluent is chosen from natural gas, synthesis gases, combustion flue gases, refinery gases, acid gases resulting from an amine unit, gases resulting from a tail gas reduction unit of the Claus process, biomass fermentation gases, gases from cement works or incinerator flue gases.

3. The process as claimed in claim 1, in which the gaseous effluent is a natural gas comprising $H_2S$ and $CO_2$ used for the selective removal of $H_2S$ with respect to $CO_2$.

4. The process as claimed in claim 1, wherein the amine of the absorbent solution is selected from the group consisting of:
    N-methyl-N-(3-methoxypropyl)-1-amino-2-propanol,
    N-methyl-N-(3-methoxypropyl)-1-amino-2-butanol,
    N-ethyl-N-(3-methoxypropyl)-1-amino-2-propanol,
    N-ethyl-N-(3-methoxypropyl)-1-amino-2-butanol,
    N-isopropyl-N-(3-methoxypropyl)-1-amino-2-propanol and N-isopropyl-N-(3-methoxypropyl)-1-amino-2-butanol.

5. The process as claimed in claim 1, wherein the absorbent solution comprises between 10% and 90% by weight of said amine and between 10% and 90% by weight of water.

6. The process as claimed in claim 1, wherein the absorbent solution further comprises a nonzero amount which is less than 20% by weight of either a primary or secondary amine compound.

7. The process as claimed in claim 6, wherein said primary or secondary amine compound is chosen from the group consisting of:
    MonoEthanolAmine,
    N-butylethanolamine,
    Aminoethylethanolamine,
    Diglycolamine,
    Piperazine,
    N-(2-hydroxyethyl)Piperazine,
    N-(2-aminoethyl)Piperazine,
    Morpholine,
    1,6-hexanediamine, and
    N,N'-dimethyl-1,6-hexanediamine.

8. The process as claimed in claim 1, wherein the absorbent solution further comprises a physical solvent selected from the group consisting of methanol and sulfolane.

9. The process as claimed in claim 1, in which the stage of absorption of the acid compounds is carried out at a pressure of between 1 bar and 120 bar and at a temperature of between 20° C. and 100° C.

10. The process as claimed in claim 9, in which the stage of absorption of the acid compounds is carried out at a pressure of between 20 bar and 100 bar.

11. The process as claimed in claim 1, in which, after the absorption stage, a gaseous effluent depleted in acid compounds and an absorbent solution laden with acid compounds are obtained and at least one stage of regeneration of the absorbent solution laden with acid compounds is carried out.

12. The process as claimed in claim 11, in which the regeneration stage is carried out at a pressure of between 1 bar and 10 bar and at a temperature between 100° C. and 180° C.

13. The process as claimed in claim 12, in which the regeneration stage is carried out at a temperature between 155° C. and 180° C.

* * * * *